May 4, 1965  W. C. WEBER  3,181,931
PROCESS FOR PRODUCING PHOSPHORIC ACID
Filed Feb. 19, 1962  2 Sheets-Sheet 1

INVENTOR
WILLIAM C. WEBER

May 4, 1965 W. C. WEBER 3,181,931
PROCESS FOR PRODUCING PHOSPHORIC ACID
Filed Feb. 19, 1962 2 Sheets-Sheet 2

INVENTOR.
WILLIAM C. WEBER

United States Patent Office 3,181,931
Patented May 4, 1965

3,181,931
PROCESS FOR PRODUCING PHOSPHORIC ACID
William C. Weber, Westport, Conn., assignor to Dorr-Oliver Incorporated, Stamford, Conn., a corporation of Delaware
Filed Feb. 19, 1962, Ser. No. 173,919
Claims priority, application Great Britain, Feb. 17, 1961, 5,887/61
6 Claims. (Cl. 23—165)

The present invention relates to a process and apparatus for treating substances in several stages and more particularly to an apparatus for effecting the reaction between solids and liquids in a single tank reactor. While the original embodiment of this invention was developed for the production of phosphoric acid by the wet process method in which phosphate rock is reacted with an acid, it is to be understood that the invention is not limited to such an embodiment.

In its apparatus aspect the present invention comprises a treatment vessel having a bottom surrounded by a substantially upright boundary wall; a substantially upright inner wall upstanding from said bottom to define an inner compartment surrounded by the outer compartment defined between said boundary wall and said inner wall; agitation devices arranged at spaced intervals in said outer compartment and operable to provide a series of agitation zones surrounding said inner compartment; partition means in said outer compartment between said boundary wall and said inner wall; means for introducing at least one substance to be treated into a first agitation zone adjacent one face of said partition means; a final agitation zone in said outer compartment adjacent the face of said partition remote from said first agitation zone; a flow transfer passage leading into said inner compartment from the final agitation zone of said outer compartment; and means for withdrawing treated material from said inner compartment.

Such an arrangement provides for flexibility of operation and, in many cases, enables the inner compartment to take the place of flow stabilization or surge tanks which are often employed to provide a constant rate of flow to later processing stages.

It is also preferred that the treatment vessel shall be enclosed, thus making it possible to vent the entire vessel through a single fume discharge stack leading out through the top.

When the treatment for which the invention is used involves exothermic reactions, the apparatus according to the invention simplifies the overall cooling problem because, as there is hydraulic communication between the successive stages, there is facility for immediate direct heat exchange between them. In consequence an overall balanced temperature control is possible, as distinct from the prior proposals utilizing separate vessels for the various stages of treatment, wherein it was necessary to control excessive temperature in certain zones by complicated arrangements for recycling cooled material from cooler zones often with external cooling before return to the system.

In its process aspect the invention has considerable significance in fertilizer production. In many fertilizer production processes the basic starting material is phosphate rock which is either naturally fine or is ground to finely divided form and then reacted with acid, such as sulphuric acid, to produce phosphoric acid and gypsum.

For the production of phosphoric acid the treatment vessel is preferably partly filled with phosphoric acid, if phosphoric acid is available. If the plant is a new one starting up for the first time in a remote area where a stored supply of phosphoric acid is not available, the treatment vessel can be partly filled with water and the acid strength will be built up as the process continues and the excess water will eventually be evaporated.

Starting the process with the tank partly filled with phosphoric acid or water as described above the ground phosphate rock is fed into the first agitation zone. The attacking acid, e.g., sulphuric acid, or some part of the total acid required for complete acidulation of the rock could also be introduced into the first agitation zone, but actually, in the process according to the present invention, it is preferred to begin adding the acid at a second or third agitation zone, because there seems to be a general improvement in the process if the finely divided rock is first well wetted before being contacted with the attack acid.

The reaction between the rock particles and the acid continues progressively in the successive agitation zones until the resulting slurry of gypsum (assuming the attack acid is sulphuric acid) in phosphoric acid reaches the final agitation zone of the outer compartment. The slurry then flows to the central compartment from which it is finally withdrawn from the treatment vessel, whereby it is assured that there is a continuous circular flow in one direction starting at the first agitation zone and continuing progressively through the intermediate agitation zones in turn until the final agitation zone is reached. This swirl action is somewhat augmented by the fact that the agitators preferably all rotate in the same direction, e.g., clockwise and in the same direction as the circular flow pattern in the outer compartment. This flow pattern is extremely important for a number of reasons. For example, the outer compartment will almost always have a far greater slurry holding capacity than the inner tank, thus ensuring a long detention time in the outer compartment, during which the reaction can proceed well on the way to completion. Furthermore, as, according to the present invention, the reacted slurry flows to the central compartment only from the final agitation zone, no unreacted rock particles are likely to find their way into the inner compartment for withdrawal therefrom in the final product.

There are no doubt many reactions in which all the initially introduced feed material will be fully reacted by the time it is transferred to the inner compartment. However, phosphoric caid producers seem to have become completely enamoured of the idea that, in order to achieve the maximum possible $P_2O_5$ recovery, it is necessary to provide for recycling a substantial quantity of the slurry from a later reaction stage back to an earlier reaction stage or back to the beginning of the system. Therefore, according to the invention, when recycling is required, the partition is provided with an opening or transfer passage through which a controlled amount of slurry can be fed back to the first agitation zone from the final agitation zone of the outer compartment. It should, however, be remembered that, even when recycling is provided for, the inner compartment is not in the recirculation system thus minimizing the possibility of flow of unreacted feed material into the inner compartment.

In order that it may be clearly understood and readily carried into effect, the invention will now be described, by way of example, with reference to the accompanying diagrammatic drawings, in which.

Figure 1:
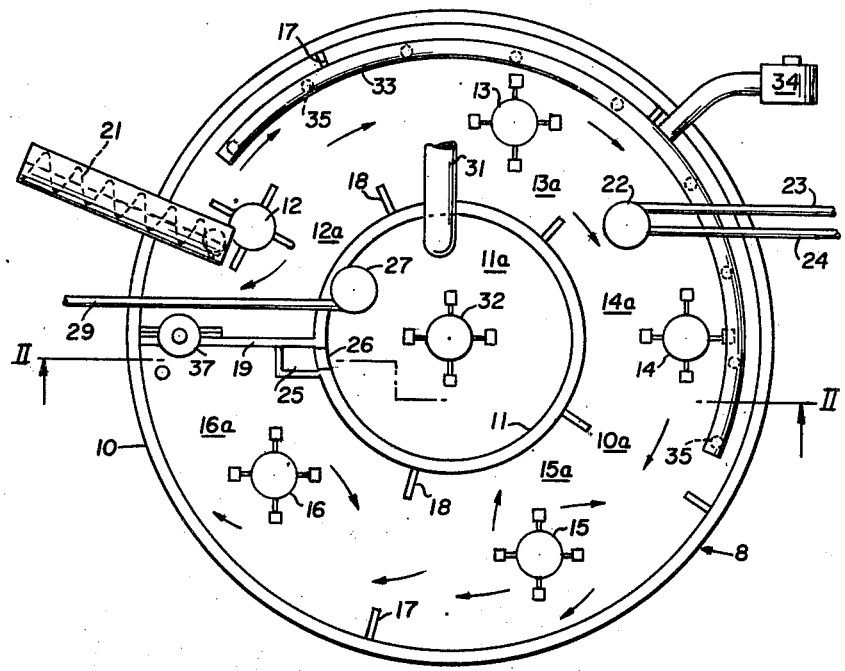
FIGURE 1 is a plan view looking down upon the top of a reaction vessel for the production of wet process phosphoric acid and which can be regarded as having a transparent top in order to reveal the interior of the vessel and the apparatus therein.
Figure 2:
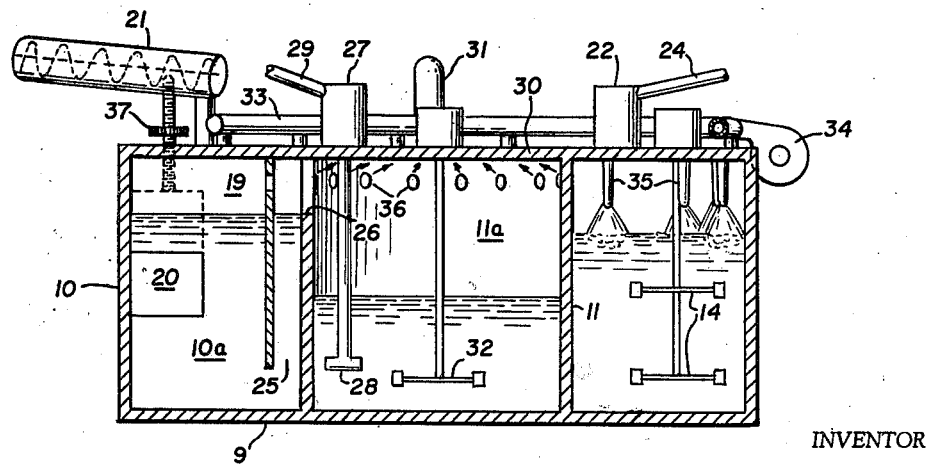
FIGURE 2 is a section taken on the line II—II of FIGURE 1.
Figure 3:
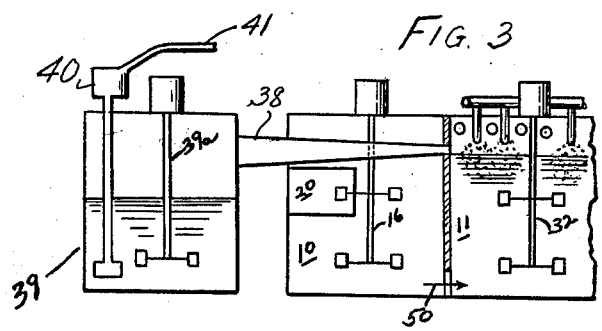
Figure 4:
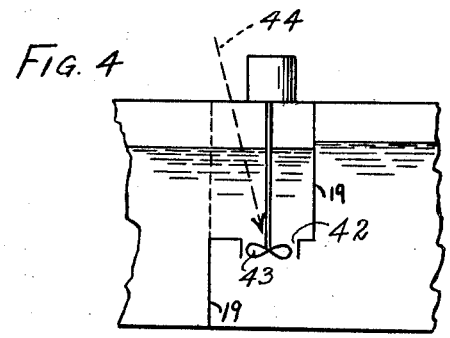
Figure 5:
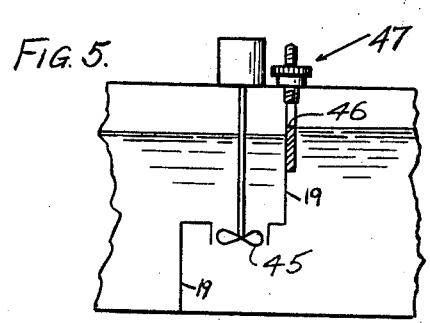

FIGURES 3, 4, and 5 are fragmentary elevations illustrative of certain modification which may be embodied in the apparatus according to FIGURES 1 and 2.

Referring now to FIGURES 1 and 2 of the drawings, the reference numeral 8 indicates a cylindrical treatment vessel having a bottom 9 surrounded by an upright outer wall 10 and an upright inner wall 11 defining therein an inner compartment 11a. Said inner compartment 11a is surrounded by an outer or annular compartment 10a defined between said outer wall and said inner wall 11. A plurality of agitators 12, 13, 14, 15 and 16 suspended from the roof of the structure, project down into the annular space or outer compartment defined between the outer wall 10 of the vessel and the inner wall 11 at spaced intervals to define successive continuous reaction zones or zones of agitation indicated generally by reference numerals 12a, 13a, 14a, 15a, and 16a. The treatment vessel is further provided with vertical peripheral baffles 17 and 18 on walls 10 and 11 respectively, as shown, to facilitate movement of the slurry around the annular compartment 10a and to minimize the possibility of the slurry short-circuiting zones. The inner compartment forms, as it were, a core from which there extends outwardly to the outer wall 10 of the vessel a partition 19 which, as shown in FIGURES 1 and 2, comprises a vertical radially extending plate having an opening 20 of substantial area extending through it.

Phosphate rock particles to be reacted are introduced by the screw conveyor 21 into the vortex produced by the agitator 12, which can be regarded as operating in the first agitation zone 12a. Generally it is preferred that the agitator 12 shall produce a high degree of agitation so that the introduced rock is thoroughly wetted with the liquid of the slurry circulating in the first and second agitation zones 12a and 13a. Sulphuric acid for attacking the rock particles is preferably introduced into the slurry between the second and third agitators 13 and 14. The sulphuric acid flows to a mixing unit 22 through the conduit 23 and from the mixing unit the acid discharges in a form diluted by wash liquor, which conveniently can come from a later stage of the process and generally will be dilute phosphoric acid introduced through the dilution conduit 24. On the face of the baffle 19 remote from the first agitation zone 12a at which the rock is introduced, there is provided a transfer duct 25 which opens inwardly into the interior of the inner compartment 11a for transfer of liquid into the inner compartment when the liquid level in the vessel reaches the height of the discharge weir 26. A suction pump indicated generally by reference numeral 27 having a submerged inlet 28 in the inner compartment 11a serves to withdraw liquid from the inner compartment for discharge along the discharge conduit 29 leading to a separation station, not shown, usually filters at which the precipitated solids are filtered and washed out. The filtrate coming from the filters is phosphoric acid and the wash liquor collected at the filters is dilute phosphoric acid, which can be returned to the mixing unit 22.

It is a preferred feature of the invention that the vessel is completely enclosed by a roof structure 30, whereby the whole interior of the vessel can be vented through a single stack pipe 31, usually connected to a scrubber (not shown).

The inner compartment is provided with an agitator 32 (or a plurality of such agitators) in order to avoid the settling of solids therein.

Cooling air for cooling the mass undergoing reaction may be blown onto the surface of the liquid or introduced below the liquid surface such as through nozzles 35, supplied by a common manifold 33 and fan 34.

As diagrammatically represented in FIG. 1 the reaction mass is generally cooled during the initial reaction stages when the acid is attacking the phosphate rock since most of the heat is generated at this point. However, cooling air may be provided in the vessel as required.

The entire vessel is preferably kept under a slight negative pressure by exhausting fumes, air, and water vapour through the stack pipe 31. Holes 36, in the top of the inner wall 11 permit the vapors to pass from the outer compartment into the inner compartment and be removed through stack pipe 31.

It will be understood that in operation the reaction mass circulates from the first agitation zone 12a to the last agitation zone 16a of the outer compartment from which it is discharged into the inner compartment. However, the opening 20 in the baffle 19 provides passage for a certain amount of the slurry to recycle from the last agitation zone to the first agitation zone or the head end of the system. To control the rate of recycle flow, provision is made for varying the area of the opening 20 by means of the adjustable plate which may be raised or lowered by the externally operable screw jack or like device 37.

In order to stabilize the feed to the filters and avoid short-circuiting of unstable slurry, it may be desirable to operate with the inner compartment 11a full at all times and to discharge by overflow to an additional tank alongside the reactor. Such an arrangement is seen in FIGURE 3 wherein the overflow discharges from the inner compartment through the discharge conduit 38 into the separate tank 39 which preferably has an agitator 39a and from which the slurry is discharged by the pump 40 leading off through the conduit 41 to the filters. The tank 39 can be operated at different levels to provide surge capacity ahead of the filter station. Another alternative feature which may be seen in FIGURE 3 is that, in this case slurry passes from the last of the agitation zones of the outer compartment to the inner compartment through a gap at the foot of the wall of the inner compartment as indicated by the arrow 50.

There are many alternative methods whereby the controllable recirculation may be provided. For example, as shown in FIGURE 4 the baffle is provided with a fixed opening 42 in which a variable sped axial flow impeller 43 operates. In this case it may be desirable to introduce the phosphate rock directly into the vortex produced by the impeller in the immediate vicinity of the opening 42 as indicated by the dotted line arrow 44 to take advantage of the extreme agitation prevailing in that area.

A further variant for controlling the recirculation is seen in FIGURE 5, wherein there is substituted for the variable speed impeller of FIGURE 4, a constant speed impeller 45 which is operated in conjunction with an adjustable overflow weir 46, the effective height of which can be adjusted by the external screw jack device 47. This arrangement operates on the principle that the impeller must develop sufficient head or there must be a pressure drop across the baffle sufficient to set up the desired swirl or recirculation so that, by varying the pressure drop or super-elevation, the rate of swirl can be controlled.

In all the arrangements described the inner compartment is not in the recirculation system and receives substantially no unreacted rock particles. However, to avoid undesirable settling of solids, the central compartment will almost always be provided with an agitator. The central compartment can also be provided with air cooling jets as shown, for example, in FIGURE 3.

It is expected, from theoretical considerations, and based on pilot plant tests, a reactor according to the invention will be able to leave less $P_2O_5$ in the gypsum, of the order of 1.0 to 1.5% of the $P_2O_5$ in the rock, than is obtainable with conventional multiple tank systems.

The most serious cause of $P_2O_5$ losses in wet process phosphoric acid manufacture is the formation of insoluble dicalcium phosphate in association with the gypsum—the so-called citrate soluble loss. The losses of undissolved $P_2O_5$ can be negligible in a well designed system. The water soluble losses are a function of the filter. The citrate soluble loss is, however, a function of the system $P_2O_5$—$CaO$—$SO_4$. The loss is proportional to the $P_2O_5:SO_4$ ratio, therefore, the higher the sulphate, the lower this type of loss. On the other hand, if the sulphates are too high, they tend to increase undissolved losses by gypsum coating of the rock particles and high sulphates result in poor gypsum. With a multiple tank system and recirculation, one must necessarily accept a range of sulphates between the high, where the sulphuric acid is added, and the low point, where the rock is added. They cannot be added simultaneously without other undesirable results. With the single treatment vessel system of the invention giving, in effect, tremendously more recirculation, it is possible to maintain a higher average sulphate without exceeding the maximum at which the gypsum will be affected and coating will occur. By being able to adjust the rate of swirl or recirculation, it is possible to choose the optimum point where the maximum effect will be obtained from increased recirculation and the minimum detrimental effect from short-circuiting and it is, therefore, possible to increase the overall recovery and, at the same time, obtain excellent gypsum to an extent that is not possible economically with multiple tank systems or with a conventional single tank reactor.

While this invention has ben described and illustrated in certain embodiments, it is readily apparent that obvious equivalents exist for specific details contained in the illustrative embodiments. It is, therefore, intended that all such equivalents as may be embraced within the scope of the subjoined claims are to be considered as part of this invention.

I claim:

1. Process for continuously producing phosphoric acid by reacting phosphate rock with sulfuric acid comprising the steps of, establishing a confined substantially unobstructed cyclic stream of a reaction slurry obtained by acidulating phosphate rock with acid, establishing along said cyclic stream a plurality of successive continuous reaction zones comprising at least a feed zone wherein phosphate rock and acidulating acid is introduced into said stream, an intermediate reaction zone wherein the reaction between said rock and said acid initiated in said feed zone is permitted to continue, and a discharge zone wherein reaction slurry is discharged from said stream, said discharge zone being preferably adjacent said feed zone but functionally remote therefrom, introducing phosphate rock into said feed zone, separately introducing acidulating acid into said feed zone for reaction with said rock, allowing said rock to react with said acid while circulating in said stream from said feed zone to said discharge zone whereby a slurry of gypsum and phosphoric acid is formed, discharging the thus produced slurry from said discharge zone and separating said discharge zone from said feed zone whereby a unidirectional flow pattern of the reaction slurry from the feed zone to the discharge zone is maintained.

2. Process according to claim 1 wherein a portion of said slurry is continuously recirculated from the discharge zone to said feed zone.

3. Process according to claim 1 wherein said slurry is continuously agitated in successive zones along said cyclic stream to facilitate the reaction of the phosphate rock with the acid.

4. Process according to claim 3 wherein said continuous agitation maintains the uni-directional flow pattern of the reaction slurry in said cyclic stream.

5. Process according to claim 1 wherein said reaction slurry is discharged into a zone surrounded by said confined cyclic stream.

6. Process for continuously producing phosphoric acid by reacting phosphate rock with sulfuric acid which comprises, establishing a confined substantially unobstructed endless cyclic stream of a reaction slurry obtained by acidulating phosphate rock with sulfuric acid, establishing along said cyclic stream a plurality of successive continuous reaction zones comprising at least a feed zone wherein phosphate rock and acidulating acid is introduced into said stream, an intermediate reaction zone wherein the reaction between said rock and said acid initiated in said feed zone is permitted to continue, and a discharge zone wherein reaction slurry is discharged from said stream, said discharge zone being preferably immediately adjacent said feed zone but functionally remote therefrom, introducing phosphate rock into said feed zone, separately introducing acidulating acid into said feed zone for reaction with said rock, allowing said rock to react with said acid while circulating in said stream from said feed zone to said discharge zone whereby a slurry of gypsum in aqueous phosphoric acid is formed, continuously agitating said slurry in said successive zones, discharging a portion of the thus produced slurry from said discharge zone into a zone surrounded by said confined cyclic stream, separating said discharge zone from said feed zone whereby a uni-directional flow pattern of the slurry in the cyclic stream is maintained and continuously and controllably recirculating a portion of said reaction slurry from said discharge zone to said feed zone.

References Cited by the Examiner

UNITED STATES PATENTS

| Re. 19,045 | 1/34 | Larsson | 23—165 |
| 629,996 | 8/99 | Holtman | 23—285 |
| 2,577,856 | 12/51 | Nelson | 23—285 |
| 2,810,630 | 10/57 | Herele | 23—285 |
| 2,832,674 | 4/58 | Ranzenberger | 23—285 |
| 3,017,247 | 1/62 | Huxley | 23—165 |
| 3,023,089 | 2/62 | Graves et al. | 23—259.2 |

FOREIGN PATENTS 1,212,825   3/60   France.

MAURICE A. BRINDISI, *Primary Examiner.*

GEORGE D. MITCHELL, *Examiner.*